United States Patent [19]
Pan et al.

[11] Patent Number: 5,835,367
[45] Date of Patent: Nov. 10, 1998

[54] DISTRIBUTED PLANNAR-TYPE HIGH VOLTAGE TRANSFORMER

[75] Inventors: Tsung-Ming Pan, Ping Tung; Hui-Pin Yang, Taipei, both of Taiwan

[73] Assignee: Industrial Technology Research Institute, Hsinchu Hsien, Taiwan

[21] Appl. No.: 9,178

[22] Filed: Jan. 20, 1998

[51] Int. Cl.⁶ .............................. H02M 3/18; H01F 27/30
[52] U.S. Cl. ............................ 363/61; 363/68; 336/212; 336/218
[58] Field of Search .................................. 363/59, 60, 61, 363/65, 67, 68; 336/175, 185, 83, 212, 218, 232, 233, 200

[56] References Cited

U.S. PATENT DOCUMENTS

| | | | |
|---|---|---|---|
| 4,024,452 | 5/1977 | Seidel | 363/16 |
| 4,868,732 | 9/1989 | Gillet et al. | 363/90 |
| 5,023,768 | 6/1991 | Collier | 363/68 |
| 5,231,564 | 7/1993 | Pellegrino et al. | 363/61 |
| 5,335,161 | 8/1994 | Pellegrino et al. | 363/61 |
| 5,485,365 | 1/1996 | Dan-Harry | 363/132 |
| 5,583,474 | 12/1996 | Mizoguchi et al. | 336/83 |
| 5,598,327 | 1/1997 | Somerville et al. | 363/131 |
| 5,757,633 | 5/1998 | Bowles | 363/71 |
| 5,781,077 | 7/1998 | Leitch et al. | 332/117 |

*Primary Examiner*—Adolf Berhane
*Attorney, Agent, or Firm*—McDermott, Will & Emery

[57] ABSTRACT

Voltage transforming apparatus for receiving a system input voltage and then generating a system output voltage is disclosed herein, the voltage transforming apparatus including the following devices: Planar voltage transforming device, which is used to generate a module output voltage responding to the rate of change of the magnetic flux. The magnetic flux is induced by the system input voltage. The planar voltage transforming device including a first terminal having a first voltage and a second terminal having a second voltage. The first voltage is higher than the second voltage, and the output voltage of the planar voltage transforming device is responding to the difference between the first voltage and the second voltage. Coupling device for electrically coupling the planar voltage transforming device. In addition, the summation of the output voltage of the planar voltage transforming device is equal to the system output voltage.

12 Claims, 7 Drawing Sheets

DISTRIBUTED PLANNAR-TYPE HIGH VOLTAGE TRANSFORMER

BACKGROUND OF THE INVENTION

1. Field of the Invention

This invention relates to a planar-type high voltage transformer, and particularly relates to a distributed planar-type high voltage transformer.

2. Description of the Prior Art

In the last few years, the volume of the electrical device is shrunk, so the volume of the power supply must be reduced. Whereas, the insulation between every components of the high voltage power supply is a problem. In a power supply, the coil and the core are necessary in the transformer, yet the volume of the power supply can not be reduced because the coil and the core can not be fabricated in integrated circuit. The construction of the transformer is shown in FIG. 1, there are two coils wound on a same core, a primary winding 12 and a secondary winding 14. The core is composed of a plurality of I-cores or U-cores. The primary winding 12 is a solenoidal and the secondary winding 14 is the other solenoidal. The core 10 passes the two coils by the channel at the center of the two coils. The core wound by the primary winding 12 is core leg 10a, and core wound by the secondary winding 14 is core leg 10b. Due to the difference of the number of turns on the primary winding 12 and the secondary winding 14, a first voltage across the primary winding 12 can induce a second voltage across the secondary winding 14. The induced voltage across the secondary winding 14 can be adjusted by changing the turn-ratio of the primary winding to the secondary winding. In the traditional construction of high voltage transformer, the higher the output voltage is needed, the larger the turn-ratio is required. So the volume of the traditional high voltage transformer is very large, and the number of coil in unit length is very large, thus the distributed effect is obvious.

To reduce the dimension of the transformer, the small-size planar coil and the planar transformer have been developed. The traditional planar coil comprises a spiral planar coil, two insulation layers sandwiching the spiral planar coil and two magnetic plates sandwiching the two insulation layers. The traditional transformer comprises two spiral planar coils, one as the primary winding, the other as the secondary winding. Three insulation layers sandwich the two spiral planar coils, two magnetic plates sandwich those three insulation layers. The spiral coils compose a transformer in two methods, one is a spiral coil forming a winding of a transformer, the other is two spiral planar coils mounting on both sides of a insulation layer. These planar elements are disclosed in "High-Frequency of a Planar-Type Microtransformer and Its Application to Multilayered Switching Regulators", IEEE Trans. Mag., Vol. 26, No. 3, May 1990, pp.1204–1209, written by K. Yamasawa et al. It is better to use the spiral planar coil in the planar transformer application, because the spiral planar coil has better inductance and bandwidth quality factor Q. In fact, many modes of the planar coil having spiral planar coil is manufactured, one of them is disclosed in FIG. 2. The planar coil includes a spiral planar coil 20 winding in a rectangle, two polyimid films 22a and 22b sandwiching the spiral planar coil 20 and two Co-base amorphous alloy ribbon 24a and 24b sandwiching the two polyimid films 22a and 22b. In addition, various types of planar magnetic element are disclosed in U.S. Pat. No. 5,583,474, and the structure of the planar coil is shown in FIG. 3. There are two insulation layers 32a and 32b, two Co-base amorphous alloy ribbon 34a and 34b and a spiral planar coil 30. The spiral planar coil is sandwiched by the two insulation layers 32a and 32b, and the two Co-base amorphous alloy ribbon 34a and 34b sandwiches the spiral planar coil 30 and the two insulation layers 32a and 32b. The spiral planar coil 30 is a rectangle having the edges of $a_0$ in length. The two Co-base amorphous alloy ribbon 34a and 34b are both rectangles having the edges of w in length and t in thickness, and the distance between the two Co-base amorphous alloy ribbon 34a and 34b is g. Another type of the planar coil is shown in FIG. 4. There are three insulation layers 42a, 42b and 42c, two Co-base amorphous alloy ribbon 44a and 44b, two spiral planar coils 40a and 40b and a through-hole conductor 46. The insulation layer 42b is placed between spiral planar coil 40a and 40b, and the two insulation layers 42a and 42c sandwich the spiral planar coils 40a and 40b. Then, the two Co-base amorphous alloy ribbon 44a and 44b sandwich the two insulation layers 42a and 42c. In this kind of structure, the through-hole conductor 46 penetrates the insulation layer 42b to electrically couple the two spiral planar coils 40a and 40b. The shape of the spiral planar coil 40a and 40b is a rectangle having the edges of $a_0$ in length. The two Co-base amorphous alloy ribbon 44a and 44b are both rectangles having the edges of w in length and t in thickness, and the distance between the two Co-base amorphous alloy ribbon 44a and 44b is g. When adequate parameters ao, w, t and g are selected, there are two advantages in the two types of spiral planar coils, which are:

(1). Having magnetic shield effect, thus the leakage magnetic flux is enormously reduced;

(2). Having sufficient high inductance.

The spiral planar coil can be formed on the glass substrate and other insulating substrates, e. g. polymide. Because either a spiral planar coil or a plurality of spiral planar coils can generate the magnetic flux, the leakage magnetic flux must be blocked to prevent the electrical magnetic disturbance in the elements near the spiral planar coil. The parameter w and $a_0$ in the aforementioned two figures is adequately selected to block the leakage flux in the transformer.

Whereas, many planar coils are used in the high voltage transformer, thus the insulation is important in the planar high voltage transformer, so the material of high insulation used as the insulation layer is needed in the high voltage transformer. The cost of the high insulation material is high, in addition, the distance between every layer of the transformer must be considered carefully, thus the design of the planar high voltage transformer is difficult and the cost is high.

In addition, the high voltage high power DC power supply is presented in U.S. Pat. No. 5,023,768, in which the transformer includes a single turn primary winding driven by a capacitance magnetically coupled to a 100 Hz AC current source. The primary winding is composed of a plurality of co-axial cylindrical metal walls, every cylindrical metal wall are electrically coupled. Surrounding the cylindrical metal wall, there are different secondary windings in different positions, every secondary winding is electrically coupled to the multiplier that used to amplify and rectify the output voltage of the secondary winding. The output terminals of the multiplier are connected in series in order to add the output voltage of all the serial connected multipliers, thus the output of the serial connected multipliers is a high voltage high power output voltage. Referring to FIG. 5, the annular magnetic core 50a, 50b, and 50c are magnetically coupled to a single turn primary winding 51, and the secondary windings 52a and 52b are wound on the core 50*b* and 50*c* respectively. In addition, the secondary windings 52*a* and 52*b* are connected to the multiplier 53*b* and 53*a* respectively. Furthermore, the output terminals of the multiplier 53*b* and 53*a* are connected in series to add the output voltage. Thus, the output voltage of all the serial connected multiplier is high voltage and high power. Every multiplier is made up of the serial connected diodes and the serial connected capacitors, and the plurality of multipliers are manufactured on a printed circuit board.

The transformer in FIG. 5 uses a plurality of voltage transformer, which having a secondary winding and a multiplier magnetically coupled to a single turn primary winding. By adding the output voltage of every multiplier, the output voltage of all the multiplier is a high voltage high power output voltage. In addition, the voltage across every serial connected multiplier and secondary winding are low, thus the material forming insulating layer can be chosen as low insulation material to reduce the cost. Whatever, the leakage magnetic flux is large in this type of transformer, because the secondary winding is formed by traditional methods, i. e., the coil is wound on the ring-core to form the secondary windings. This is the reason why the volume of the transformer can not be shrunk and the leakage magnetic flux can not be reduced.

SUMMARY OF THE INVENTION

This invention relates to a planar-type high voltage transformer, and particularly relates to a distributed planar-type high voltage transformer. The voltage transforming apparatus that is used to receive a system input voltage and generate a system output voltage. The voltage transforming apparatus includes the following devices:

A module transformer winding, which is used to generate a module midterm voltage responding to the rate of change of the magnetic flux induced by the system input voltage.

A multiplier, which is used to amplify and rectify the module midterm voltage to generate the module output voltage. The module output voltage is across the output terminals of the multiplier. The multiplier is electrically coupled to the module transformer winding. The multiplier includes a first terminal and a second terminal, the first terminal having a first voltage and the second terminal having a second voltage. The first voltage is higher than the second voltage, and the output voltage of the multiplier is responding to the difference between the first voltage and the second voltage.

Transmitting device that is used to provide a transmitting media for the magnetic flux induced by the system input voltage.

A printed circuit board that is used to provide the place that the module transformer winding and the multiplier can formed on the printed circuit board. The printed circuit board having a cavity at the center of the module transformer winding, and the transmitting device penetrates the module transformer winding by the cavity.

Coupling device that is electrically coupled to the planar voltage transforming device, the summation of the output voltage of the multiplier is equal to the system output voltage.

BRIEF DESCRIPTION OF THE DRAWINGS

The above features of the present invention will be more clearly understood from consideration of the following descriptions in connection with accompanying drawings in which.

DESCRIPTION OF THE PREFERRED EMBODIMENT

Figure 1:
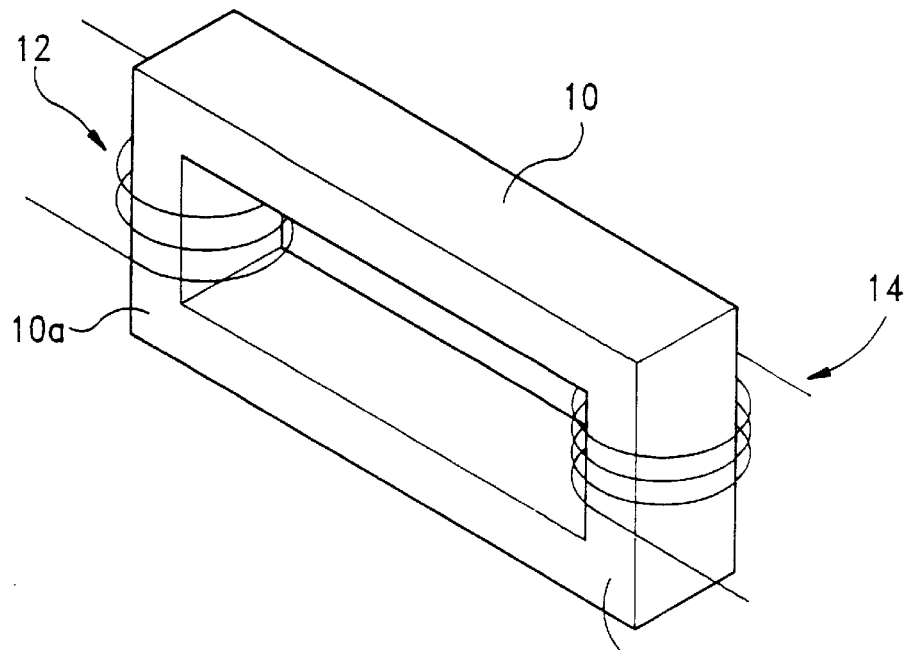
FIG. 1 shows the structure of the prior voltage transformer.
Figure 2:
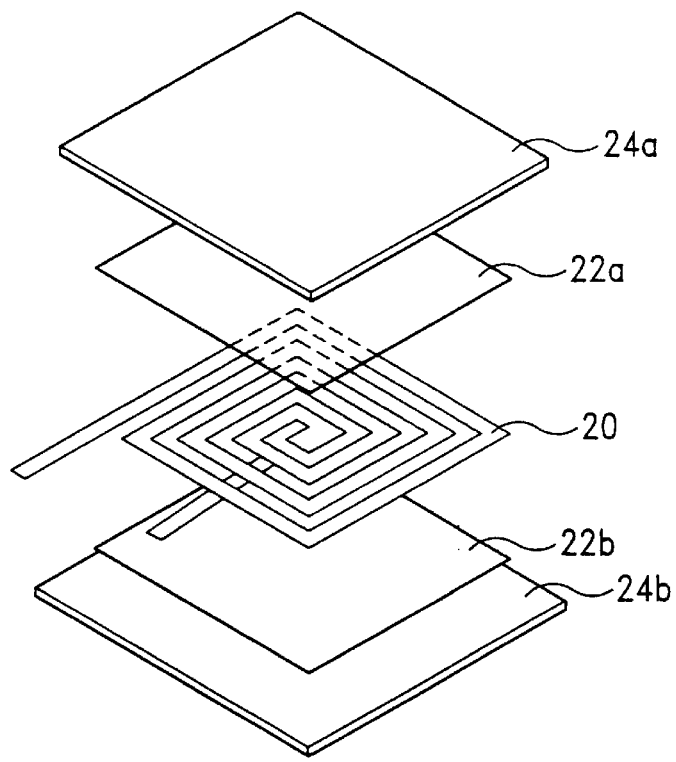
FIG. 2 shows the structure of the first traditional planar-type voltage transformer.
Figure 3:
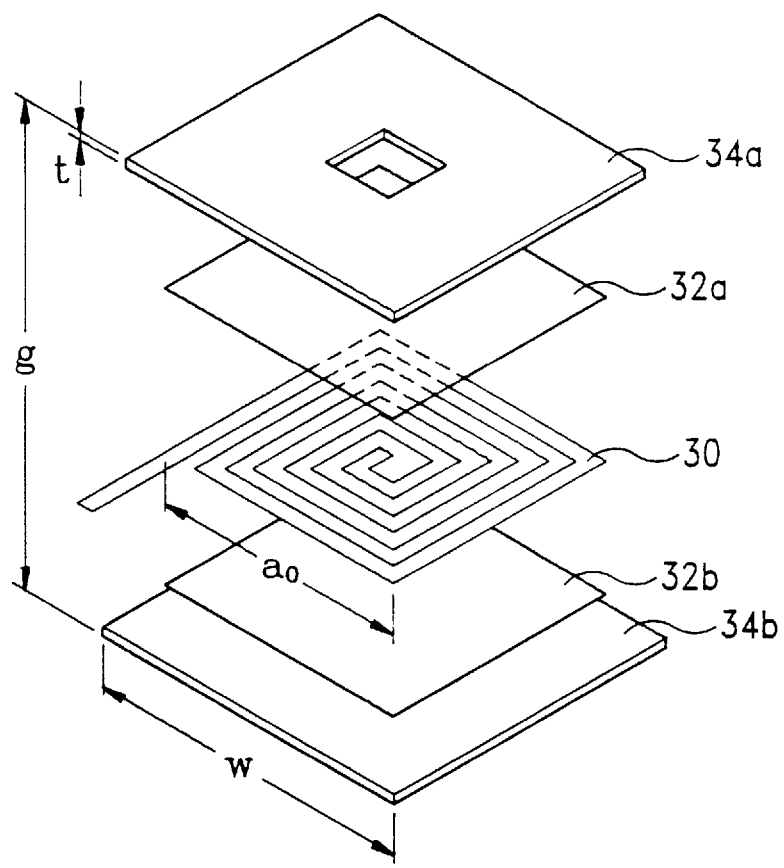
FIG. 3 shows the structure of the second traditional planar-type voltage transformer.
Figure 4:
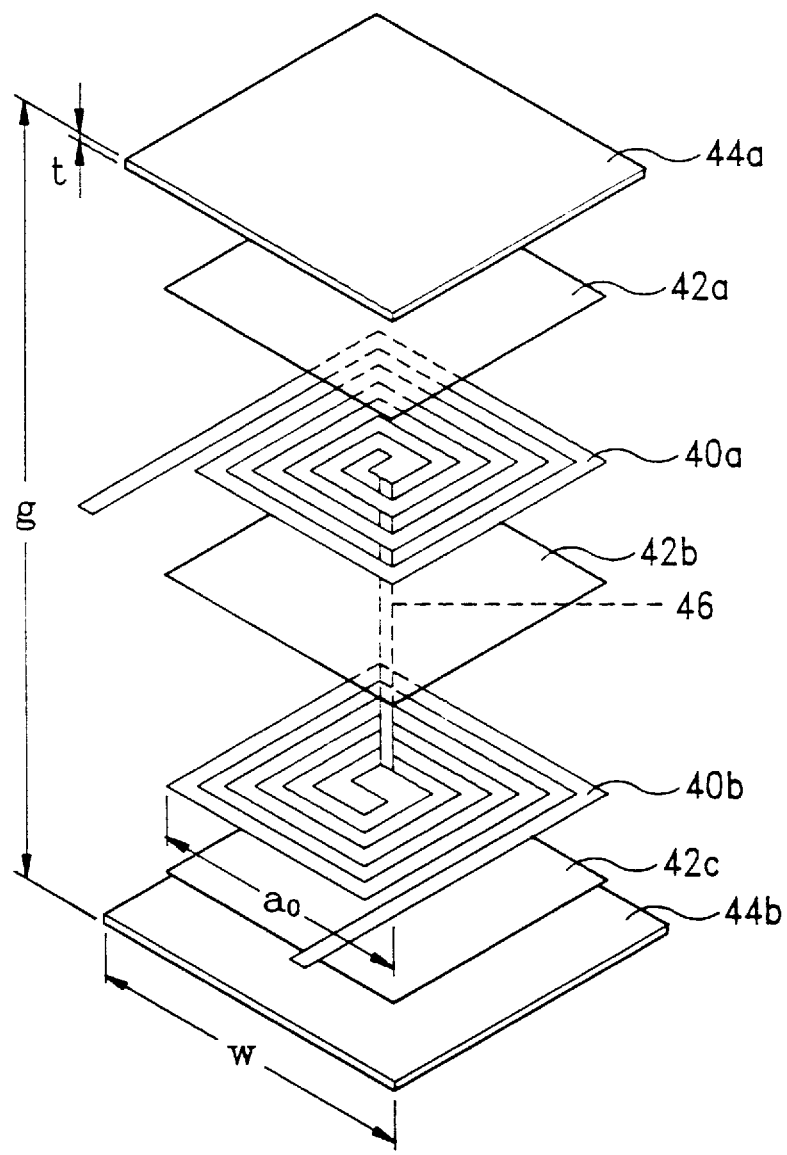
FIG. 4 shows the structure of the third traditional planar-type voltage transformer.
Figure 5:
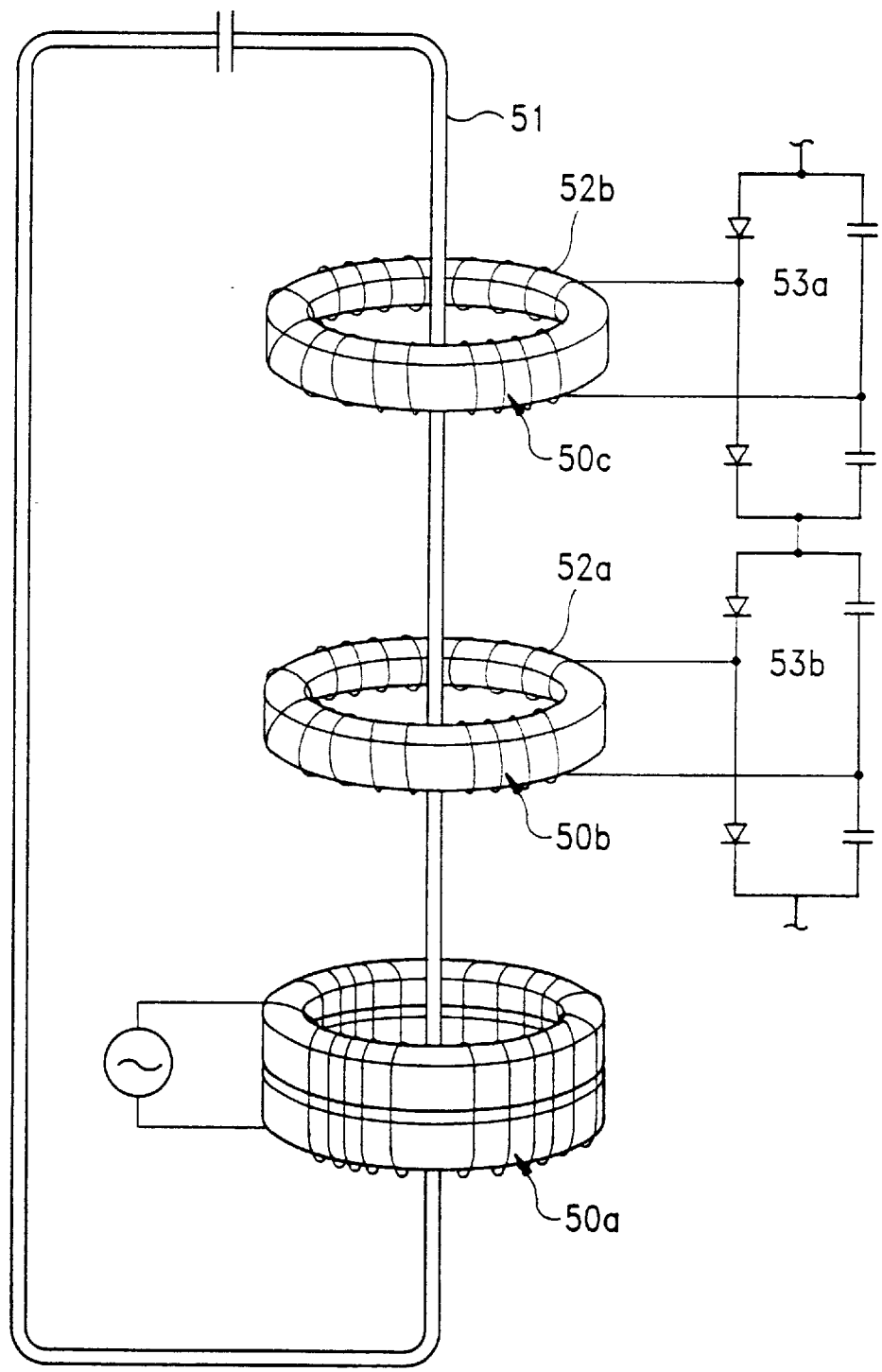
FIG. 5 shows the circuit diagram of the distributed planar-type high voltage transformer in the prior art.
Figure 6:
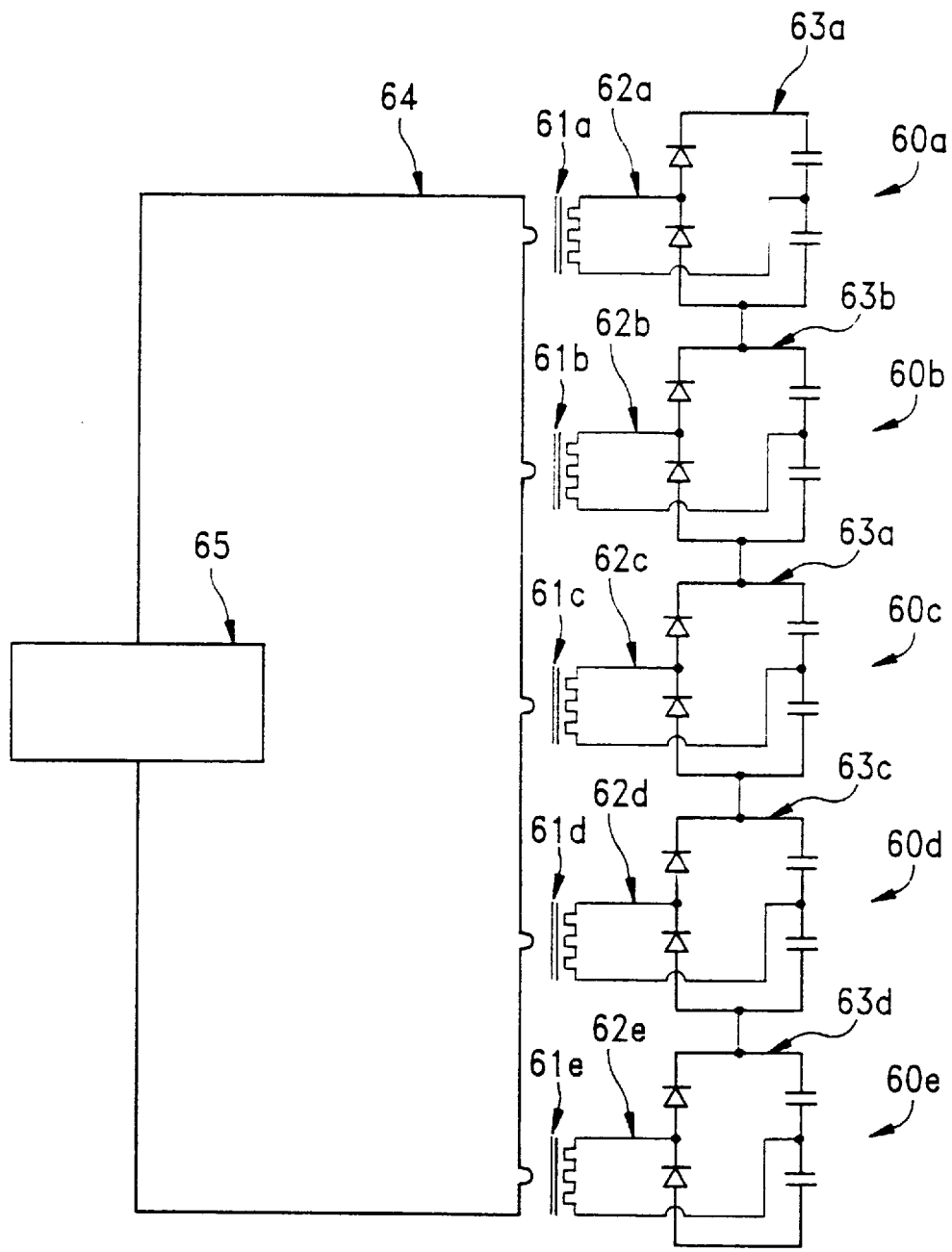
FIG. 6 shows the circuit diagram of the distributed planar-type high voltage transformer in the present invention.

The structure of the distributed planar-type high voltage transformer is shown in FIG. 6, which includes a plurality of transformers 60*a*, 60*b*, 60*c*, 60*d* and 60*e*. Because the voltage across every transformer is low, the material forming the insulation layer used in every transformer can be chosen as low insulation material to reduce the cost. There are U-cores 61*a*, 61*b*, 61*c*, 61*d* and 61*e* in the transformers 60*a*, 60*b*, 60*c*, 60*d* and 60*e* respectively. The secondary windings 62*a*, 62*b*, 62*c*, 62*d* and 62*e* on the printed circuit boards are electrically coupled to the multipliers 63*a*, 63*b*, 63*c*, 63*d* and 63*e* respectively. To add the output voltage of all the transformers, the multipliers 63*a*, 63*b*, 63*c*, 63*d* and 63*e* are serial connected, and the output voltage is a high voltage. The primary winding 64 is a single turn primary winding passing through the center of the U-cores 61*a*, 61*b*, 61*c*, 61*d* and 61*e*, the voltage on the primary winding 64 is generated by an AC current source or an inverter 65. Due to the electrical-magnetic reaction between the primary winding 64 and the U-cores 61*a*, 61*b*, 61*c*, 61*d* and 61*e*, the induced voltage is generated by the U-cores 61*a*, 61*b*, 61*c*, 61*d* and 61*e*. The plurality of multipliers 63*a*, 63*b*, 63*c*, 63*d* and 63*e* formed on a printed circuit board receive and amplify the induced voltage in U-cores 61*a*, 61*b*, 61*c*, 61*d* and 61*e* respectively. Because the output terminals of the plurality of multipliers 63*a*, 63*b*, 63*c*, 63*d* and 63*e* are serial connected, the output voltage of the serial connected transformer is added and the total output voltage is thus a high voltage.

Figure 7:
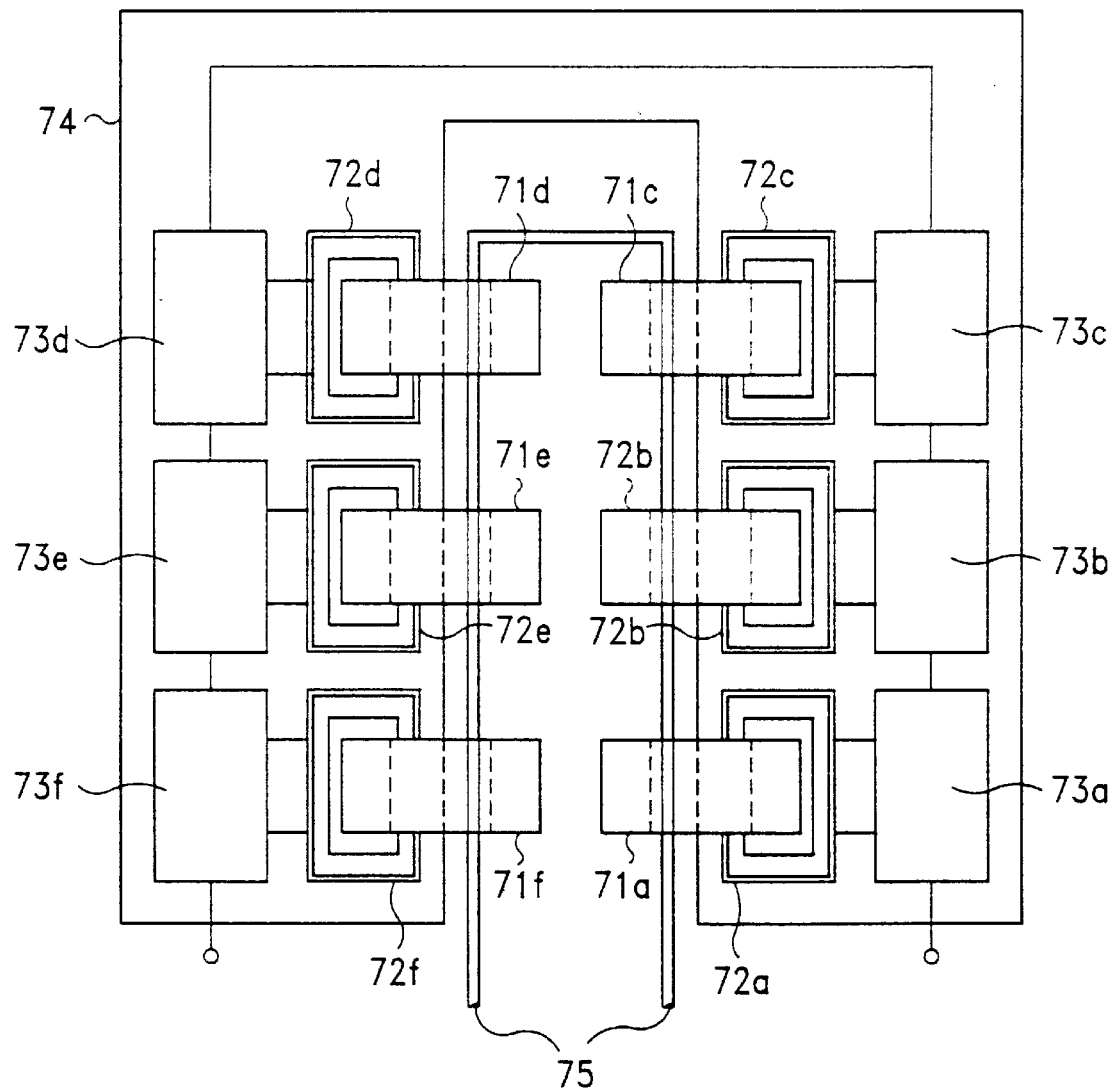
FIG. 7 shows the structure of the distributed planar-type high voltage transformer in the present invention.

The structure of the distributed planar-type high voltage transformer is shown in FIG. 7, wherein the secondary windings 72*a*, 72*b*, 72*c*, 72d, 72*e* and 72*f,* and the multiplier 73*a*, 73*b*, 73*c*, 73*d*, 73*e* and 73*f* are fastened on a printed circuit board 74. The primary winding 75 passing through the cavities of the U-cores 71*a*, 71*b*, 71*c*, 71d, 71*e* and 71*f,* and the induced voltage is generated by the secondary windings 72*a*, 72*b*, 72*c*, 72*d*, 72*e* and 72*f*. The multiplier 73*a*, 73*b*, 73*c*, 73*d*, 73*e* and 73*f* receive, amplify and rectify the induced voltage, followed by serial connecting the output terminals of all the multipliers. Thus the total output voltage is a high voltage. Referring to FIG. 7, there are cavities on the printed circuit board at the place where the U-cores penetrating the secondary windings. Meanwhile, there are hollows at the center of cores, and the primary winding 75, which is a single turn primary winding passing through all the cores. The secondary windings are all windings made of turns of coil.

Figure 8:
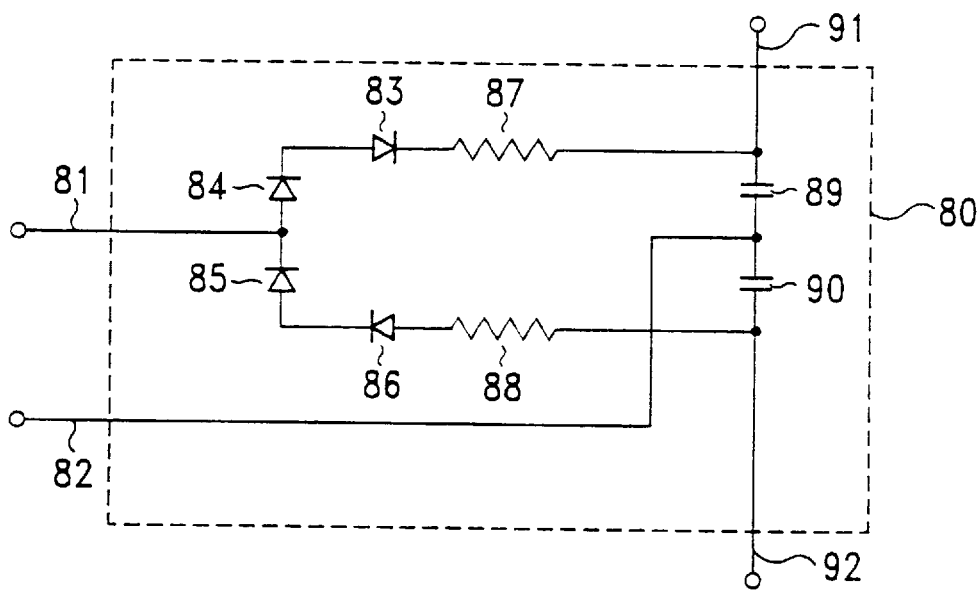
FIG. 8 shows the circuit diagram of the multiplier used in the distributed planar-type high voltage transformer in the present invention.

Referring to FIG. 8, the circuit diagram of the multiplier is shown as multiplier circuit 80. The input terminals 81 and 82 are coupled to the output terminals of the secondary winding, and each is connected to the circuit including four diodes 83, 84, 85 and 86, two resistors 87 and 88 and two capacitors 89 and 90. Resistor 87 is serial connected to capacitor 89, diode 83 and 84, meanwhile, resistor 88 is serial connected to capacitor 90, diode 86 and 85. Then the output terminals 91 and 92 are connected to the output terminals of the other multipliers. Thus all the output voltage of the multiplier is added and the total output voltage reaches high voltage.

The distributed planar-type high voltage transformer in the present invention includes low voltage transformers connected in series, in which every transformer bears low voltage. For the reason mentioned above, the advantages of the distributed planar-type high voltage transformer in the present are:

1. Because the structure of the distributed planar-type high voltage transformer is many low voltage transformer connected in series, if there is a low voltage transformer break down, the structure of the distributed planar-type high voltage transformer can be repaired by replacing the low voltage transformer that is break down;
2. All elements in the low voltage transformer can be chosen as elements that can only bear low voltage, because the voltage across every serial connected transformer (low voltage transformer) is low;
3. Even if one serial connected transformer is break down, the influence is that, only the total output voltage is reduced, whereas, the distributed planar-type high voltage transformer would not shut down;
4. The output voltage of the distributed planar-type high voltage transformer can be adjusted by altering the number of the serial connected transformer in accordance with the need of the power supply;
5. There is no need to use I-core because the fabrication of the primary winding on the U-core is easy. In addition, the voltage across every serial connected transformer is low, the cost can be reduced;
6. The volume of the distributed planar-type high voltage transformer is reduced because every serial connected transformer is fabricated on a printed circuit board, and the leakage flux is reduced.

Although specific embodiments have been illustrated and described, it will be obvious to those skilled in the art that various modification may be made without departing from the spirit which is intended to be limited solely by the appended claims.

What is claimed is:

1. Voltage transforming apparatus for receiving a system input voltage and then generating a system output voltage, said voltage transforming apparatus comprising:

a module transformer winding for generating a module midterm voltage responsive to the rate of change of the magnetic flux induced by said system input voltage; and a multiplier for amplifying and rectifying said module midterm voltage to generate said module output voltage across the output terminals of said multiplier, said multiplier is electrically coupled to said module transformer winding, said multiplier including a first terminal and a second terminal, said first terminal having a first voltage and said second terminal having a second voltage, said first voltage is higher than said second voltage, the output voltage of said multiplier is responsive to the difference between said first voltage and said second voltage;

transmitting means for providing a transmitting media for the magnetic flux induced by said system input voltage; and a printed circuit board for providing the place for forming said module transformer winding and said multiplier, said printed circuit board having a cavity at the center of said module transformer winding, said transmitting means penetrates said module transformer winding by said cavity.

2. Voltage transforming apparatus for receiving a system input voltage and then generating a system output voltage, said voltage transforming apparatus comprising:

planar voltage transforming means for generating a module output voltage responsive to the rate of change of the magnetic flux induced by said system input voltage, said planar voltage transforming means comprising a first terminal having a first voltage and a second terminal having a second voltage, said first voltage is higher than said second voltage, the output voltage of said planar voltage transforming means is responsive to the difference between said first voltage and said second voltage; and coupling means for electrically coupling said planar voltage transforming means, the summation of the output voltage of said planar voltage transforming means is equal to said system output voltage.

3. Apparatus as claim 2, wherein said planar transforming means comprises:

a module transformer winding for generating a module midterm voltage responsive to the rate of change of the magnetic flux induced by said system input voltage; and a multiplier for amplifying and rectifying said module midterm voltage to generate said module output voltage across the output terminals of said multiplier, said multiplier is electrically coupled to said module transformer winding;

transmitting means for providing a transmitting media for the magnetic flux induced by said system input voltage; and a printed circuit board for providing the place for forming said module transformer winding and said multiplier, said printed circuit board having a cavity at the center of said module transformer winding, said transmitting means penetrates said module transformer winding by said cavity.

4. Apparatus as claim 3, wherein said module transformer winding comprises:

a spiral planar coil for generating said module midterm voltage responsive to the rate of change of the magnetic flux induced by said system input voltage;

a plurality of insulation layers for sandwiching said spiral planar coil; and a plurality of co-base amorphous alloy ribbon for preventing the leakage magnetic flux of the magnetic flux induced by said system input voltage, said plurality of co-base amorphous alloy ribbon sandwiching said plurality of insulation layers.

5. Apparatus as claim 3, wherein said transmitting means is a core having a hollow at the center of said core, the magnetic flux induced by said system input voltage flows in said core.

6. Apparatus as claim 3, wherein said planar transforming means further comprising:

a conductive wire for providing said system input voltage across said conductive wire, said conductive wire penetrating said core by said hollow, said conductive wire generating the magnetic flux induced by said system input voltage.

7. Apparatus as claim 2, wherein said coupling means is a conducting material electrically coupling said first terminal of one planar voltage transforming means and said second terminal of the other planar voltage transforming means.

8. Voltage transforming apparatus for receiving a system input voltage and then generating a system output voltage, said voltage transforming apparatus comprising:

a module transformer winding for generating a module midterm voltage responsive to the rate of change of the magnetic flux induced by said system input voltage; and a multiplier for amplifying and rectifying said module midterm voltage to generate said module output voltage across the output terminals of said multiplier, said multiplier is electrically coupled to said module transformer winding, said multiplier including a first terminal and a second terminal, said first terminal having a first voltage and said second terminal having a second voltage, said first voltage is higher than said second voltage, the output voltage of said multiplier is responsive to the difference between said first voltage and said second voltage;

transmitting means for providing a transmitting media for the magnetic flux induced by said system input voltage;

a printed circuit board for providing the place for forming said module transformer winding and said multiplier, said printed circuit board having a cavity at the center of said module transformer winding, said transmitting means penetrates said module transformer winding by said cavity; and coupling means for electrically coupling said planar voltage transforming means, the summation of the output voltage of said multiplier is equal to said system output voltage.

9. Apparatus as claim 8, wherein said module transformer winding comprises:

a spiral planar coil for generating said module midterm voltage responsive to the rate of change of the magnetic flux induced by said system input voltage;

a plurality of insulation layers for sandwiching said spiral planar coil; and a plurality of co-base amorphous alloy ribbon for preventing the leakage magnetic flux of the magnetic flux induced by said system input voltage, said plurality of co-base amorphous alloy ribbon sandwiching said plurality of insulation layers.

10. Apparatus as claim 8, wherein said transmitting means is a core having a hollow at the center of said core, the magnetic flux induced by said system input voltage flows in said core.

11. Apparatus as claim 8, wherein said planar transforming means further comprising:

a conductive wire for providing said system input voltage across said conductive wire, said conductive wire penetrating said core by said hollow, said conductive wire generating the magnetic flux induced by said system input voltage.

12. Apparatus as claim 8, wherein said coupling means is a conducting material electrically coupling said first terminal of one planar voltage transforming means and said second terminal of the other planar voltage transforming means.

* * * * *